Patented May 25, 1926.

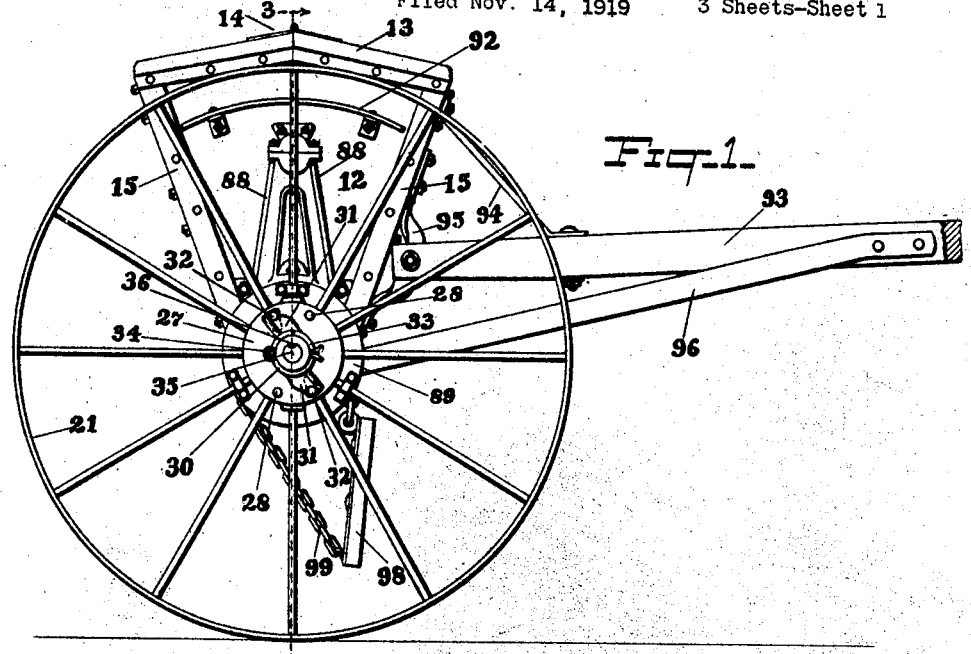
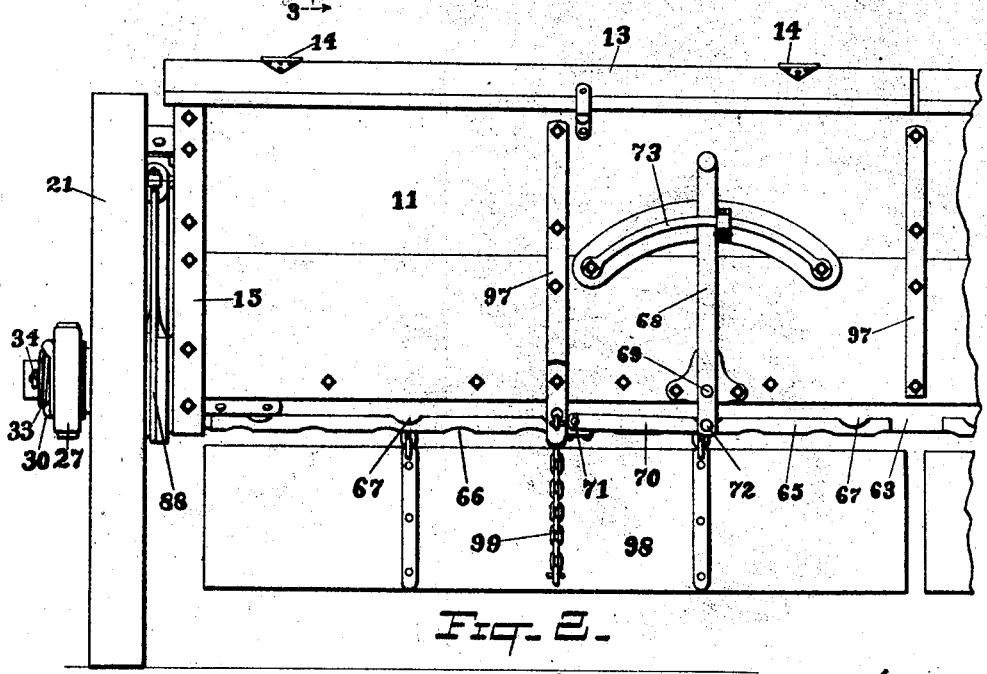

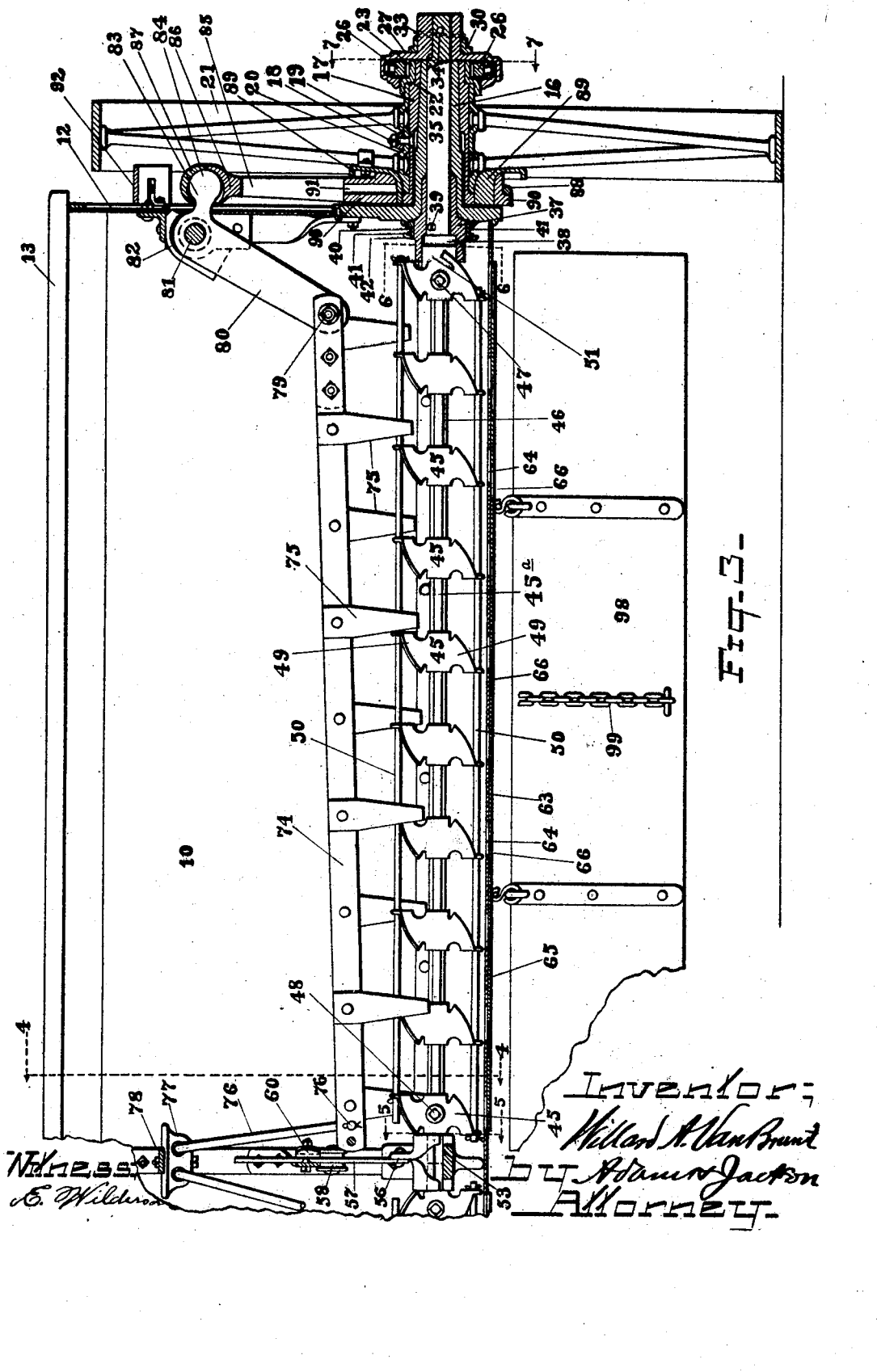

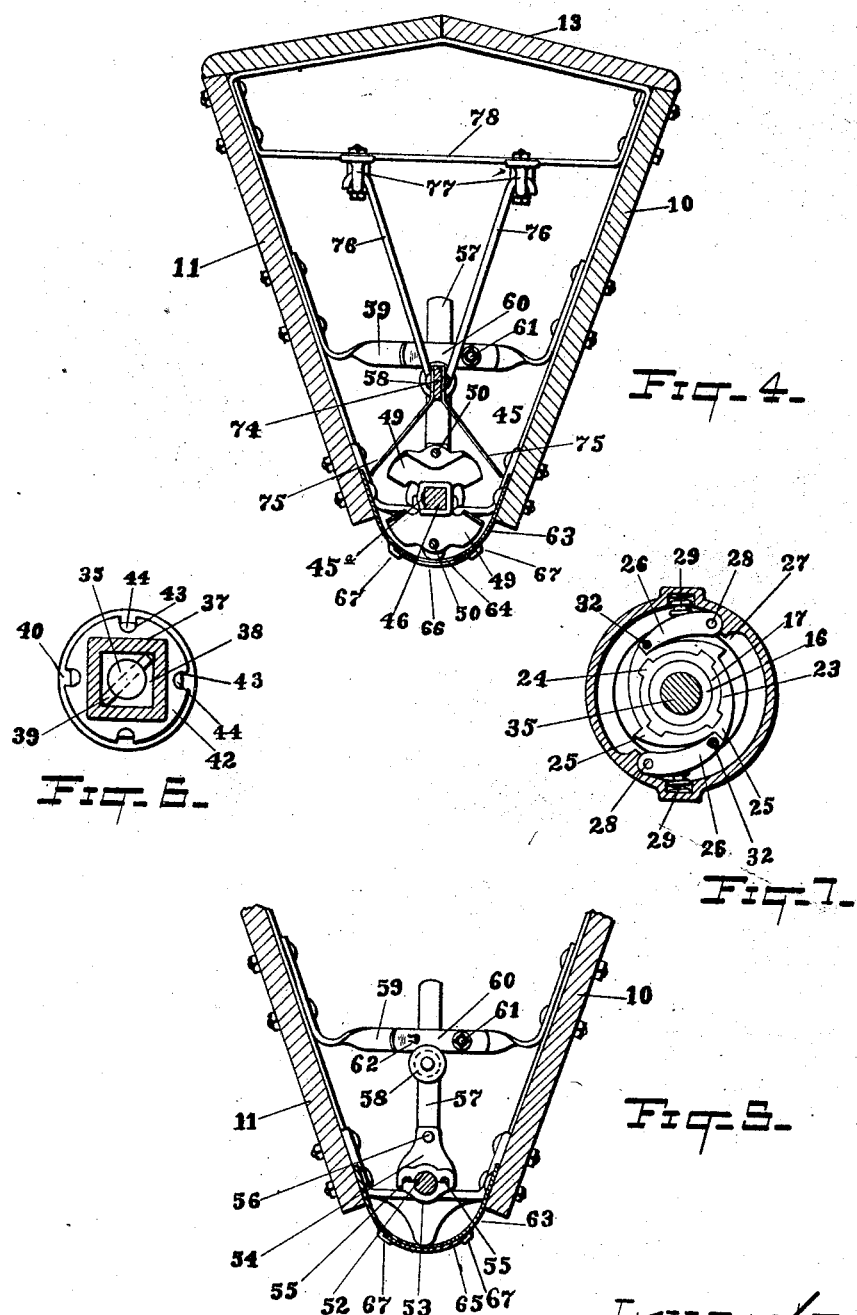

1,586,168

UNITED STATES PATENT OFFICE.

WILLARD A. VAN BRUNT, OF LOS ANGELES, CALIFORNIA, ASSIGNOR TO THE VAN BRUNT MANUFACTURING COMPANY, OF HORICON, WISCONSIN, A CORPORATION OF WISCONSIN.

MACHINE FOR SOWING FERTILIZERS.

Application filed November 14, 1919. Serial No. 337,912.

This invention relates to improvements in machines designed for sowing or distributing commercial fertilizers, such as lime, crushed rock, ashes, &c. The objects of the invention are to provide improved driving means for the operative parts contained in the fertilizer receptacle, to provide improvements in the means for supporting the receptacle upon the carrying wheels of the machine, and to improve machines of this general type in various details of construction. I attain these various objects by the devices and combinations of devices illustrated in the drawings and hereinafter specifically described. Those matters and things that I believe to be new will be set forth in the claims.

In the drawings:—

Fig. 1 is a side elevation of a machine embodying my invention;

Fig. 2 is a rear elevation of the machine, a portion of the machine being broken away;

Fig. 3 is an enlarged vertical section at line 3—3 of Fig. 1, showing the agitating means and feeding means in the right-hand half of the fertilizer receptacle and illustrating, also, the details of the bearings for that one of the wheels from which power is derived for operating said means,—the left-hand portion of the machine being broken away;

Fig. 4 is a vertical section taken at line 4—4 of Fig. 3 illustrating the center bearing for the feeding devices and the swinging support for the inner end of the agitating means;

Fig. 5 is a detail, being a vertical section taken at line 5—5 of Fig. 3 and illustrating the center bearing in which are removably mounted the inner ends of the two alined shaft members of the feeding means;

Fig. 6 is a section taken on line 6—6 of Fig. 3, and illustrating the driving connection between the wheel-driven power shaft and the outer end of the feeding means at that side of the machine; and Fig. 7 is a section taken at line 7—7 of Fig. 3, and illustrating the details of the clutch between the wheel and the shaft that is mounted therein.

Referring to the several figures of the drawings:—

The receptacle for containing the fertilizer material that is to be distributed is in the form of a hopper having downwardly converging side walls, the front wall of which is indicated by 10, the rear wall by 11, and the end walls by 12. The hopper will preferably be provided with a cover 13 hinged in place as at 14, Fig. 1. The end walls are shown as connected to the front and rear walls by angle iron strips or plates 15. Secured to the lower part of each end wall 12 of the hopper is a hollow spindle 16 (see Fig. 3) upon which is journaled a sleeve 17 that is secured, in the construction shown, by a clamp bolt 18 and washer 19 to the hub of one of the two ground wheels 21.

In each longitudinal half of the hopper are located mechanisms for agitating the material therein and feeding it therefrom, the said means in one half of the hopper being the duplicate of that in the other half, and therefore the description of one such set will suffice. In Fig. 3 is shown such mechanism for the right-hand side of the machine, together with the means by which the same are operated from the right-hand carrying wheel 21; at the other end of the machine the other carrying wheel will be constructed and provided with the same parts as shown in said Fig. 3. Each of the two sets of feeding devices—that is one at the right-hand side of the machine and one at the left-hand side of the machine—is located in the lower portion of the hopper and each is driven from its adjacent wheel through clutch and drive shaft mechanism which will now be described. The outer end portion of the sleeve 17 is provided with a shoulder, as indicated at 22, against which rests a driving ring 23. As best shown in Fig. 7, the sleeve 17 has a plurality of lugs 24 that fit in correspondingly-shaped recesses formed in the driving ring 23 whereby the ring will be positively moved as the sleeve is rotated. The outer edge of the ring 23 is provided with a plurality of teeth 25 with which two oppositely-located dogs 26 carried by a plate 27 cooperate. These dogs are pivotally mounted upon the plate 27, as indicated at 28, and are normally held in position to engage with the teeth 25 by coiled springs 29. To disengage the dogs 26 from the teeth 25 a cam device 30 is rotated—this cam device being located on a hub of the plate 27, as clearly shown in Fig. 3. This device 30 is provided with two oppositely-located cams 31—31 (see Fig. 1) which engage respectively with pins 32 formed on the dogs and thereby press the dogs outwardly about their pivots 28 against the pressure of the coiled springs 29. These pins on the dogs project through short slots in the plate 27, as indicated in Fig. 1, so that they may be engaged as stated by the cams. With the dogs thus moved out of engagement with the teeth 25 the supporting wheel 21 will not turn the plate 27, but when such dogs are in engagement with the teeth of the plate, as in Fig. 7, the plate then will be positively driven with the wheel. A coiled spring 33 (see Fig. 3) is interposed between a cotter pin 34 and the cam device 30, which spring acts frictionally to hold the shifting device 30 in the position to which it may be manually adjusted.

35 indicates a shaft extending through and journaled in the hollow spindle 16. The outer end of this shaft is made fast in any suitable manner to the hub of the plate 27 so that such shaft is positively revolved with the plate. Such connection of these parts may be by the usual lug and recess construction, as indicated at 36 in Fig. 1. The cotter pin 34, hereinbefore referred to, that passes through the hub of the plate 27 and through the shaft 35 prevents lateral shifting of one part relative to the other. 37 indicates a rotatable member mounted on the shaft 35 and having its outer end inserted in an annular recess at the inner end of the bore of the spindle. The inner end of the rotatable member 37 projects into the interior of the hopper, as clearly shown in Fig. 3, such end being enlarged and provided with a squared socket into which extends the end of the feeding device hereinafter referred to. The socketed member 37 is detachably connected with the shaft 35, so as to rotate therewith, by means of a pin 39 that extends through the shaft and has its projecting ends fitting in recesses formed in the corners of the socket 38, as clearly shown in Fig. 6. 40 indicates a washer surrounding the socketed member 37 and preventing dust and grit from passing from the receptacle into the bearing of such member 37 and to the shaft 35 in the spindle. It is held against a vertical flange on the spindle by a coiled spring 41, the other end of the spring bearing against a flange 42 formed on the outer face of the member 37. In order to ensure the turning of the washer with the member 37, the flange 42 is provided with several recesses, as shown in Fig. 6, into which project lugs 44 integral with the washer.

The machine is provided, as hereinbefore stated, with separate feeding devices and agitating devices for each longitudinal half of the machine,—each of such sets of devices being constructed and arranged as shown in Fig. 3, wherein the right-hand set is illustrated, the devices for each half being operatively connected, as there shown, and as hereinafter described, with the adjacent carrying wheel of the machine. Providing a separate feeding device and agitating means for each half of the machine, as stated, is of very great advantage in some phases of the machine's operation. For example, when finishing up "lands" or working in fields where there are "point" rows it is possible to throw the feeding device at one side of the machine out of operation by shifting the cam ring 30 that opens the clutch and thus economizing by avoiding double spreading or sowing of the fertilizing material.

Each feeding device consists of a number of separated members held in spaced relation upon a rotatable shaft. Each of such members is indicated generally by 45 and the shaft upon which they are fixed is indicated by 46, and in the construction shown (see Fig. 4) each member 45 is secured against movement longitudinally of the shaft by a wedge 45ª driven into a notch in the hub of the member. Of course, other means may be employed for securing them to the shaft. In addition to the wedge 45ª the end members 45 are secured to the shaft, in the construction shown, by bolts, the bolt for the outer member being indicated by 47 and that for the inner member by 48. Each member 45 has formed with its hub portion two oppositely-disposed wings 49 that so act upon the fertilizing material in the hopper as to force it toward and through discharge openings in the bottom of the hopper. The various feed members 45 are connected together by two rods 50, 50 that extend parallel with the shaft 46 and pass through openings formed in marginal portions of the wings. The outer end member 45 differs from the other members in that it is provided with a squared central projection 51 that fits within the socket 38 of the member 37 and thereby, of course, the feeding device as a whole will be rotated when the socketed member 37 rotates. The inner end of the shaft 46 is cylindrical, as indicated at 52 in Fig. 5, to form a bearing, and this bearing end is supported in a boxing 53 located substantially centrally of the length of the hopper and midway between the front and rear walls thereof. The upper half of the boxing is indicated by 54, and is removable so as to permit the feeding device as a whole to be quickly and easily removed when desired. By reference to Fig. 5 it will be noted that this upper half 54 of the boxing is provided with lips 55 that extend down over the edges of the boxing member 53, such construction aiding in holding the upper half of the boxing from displacement. Pivotally connected to the upper boxing member 54, at 56, is a hand lever 57 upon one face of which is rotatably mounted a flanged roller 58 that is normally in engagement with the lower edge of a cross-bar 59 that extends between the sides of the hopper. This lever 57 is normally held in an upright position by a spring clip 60, one end of which is secured to the cross-bar 59, as at 61. The spring clip has a lug 62 pressed out from its inner face, which lug acts as a latch to hold the lever 57 in place when such lever is in upright position between the cross-bar 59 and the spring 60. It is frequently desirable to clean out the hopper between periods of use to prevent the caking or hardening of material therein, and the construction and arrangement of the parts described permit the ready removal of each feeding device as a whole to facilitate such cleaning operation. When this is to be done the spring clip 60 will be forced away from the cross-bar 59 sufficiently to permit the lever to be disengaged from the latch 62, whereupon the lever will be turned on its pivot 56 sufficiently to carry it from between the latch and the cross-bar. When the lever has been so turned and the roller 58 moved away from engagement with the edge of the cross-bar, it is evident that the upper half 55 of the boxing can then be withdrawn, after which either one of the feeding devices as a whole can be removed from the hopper by lifting its inner end slightly and then drawing it longitudinally of the hopper sufficiently to withdraw the squared shoulder 51 from the socket 38 in the member 37, whereupon the feeding device can be bodily lifted out of the hopper. As clearly shown in Fig. 3, the boxing 53, 54 is wide enough to receive and properly hold the inner cylindrical ends or journals of both of the shafts 46, and hence by the operation of the single lever 57 both of such shafts can be rotatably locked in place or released from the boxing so as to permit of withdrawal in the manner described.

63 indicates the hopper bottom which is preferably formed from a sheet metal plate extending the full length of the hopper and rounded to conform substantially to the radius of the wings 49 of the feeding device. At intervals throughout its length the bottom plate 63 is provided with discharge openings 64 which are located directly beneath the feeding members 45 so that as the material within the hopper is stirred and carried around by such members it will drop or be forced out through such openings. 65 indicates a metal plate provided with openings 66 adapted to register with the openings in the hopper bottom. This plate is supported in longitudinal guides 67 carried by the hopper bottom and preferably pressed out therefrom, and, as will be understood, by adjusting such plate 65 as required it will act as a valve to regulate the size of the discharge openings in the hopper bottom, and consequently the amount of material to be discharged therethrough can be varied as desired. This plate or valve 65 is shifted by means of a hand lever 68 (see Fig. 2) pivotally mounted at 69 upon the outer face of the rear wall of the hopper, the connection of the lower end of the lever with the plate being by means of a link 70 secured to the plate at 71 and to the lever at 72. 73 is the usual index device attached to the rear wall of the hopper,—the position of the lever on the index device indicating the extent to which the feed openings are in alinement, or in other words showing the amount of the contents of the hopper that will be spread per acre.

Fertilizing materials, such as crushed rock, lime, ashes, &c., that are commonly carried in machines of this character, have a tendency to pack rather solidly in the hopper, and then bridge within the hopper above the feeding devices. It is necessary, therefore, that means be provided for keeping the material agitated over the feeding devices. In the construction shown a separate agitating means is employed in each longitudinal half of the machine, just as in the case of the feeding devices. Each of these agitating means is connected with and operated from one of the supporting wheels, and, as in the case of the feeding devices, a description of one of the agitating means will suffice. In Fig. 3 is shown the agitating means employed at the right hand side of the machine, and, as there shown, such means comprises a bar 74 having secured thereto at regular intervals downwardly diverging fingers 75 which lie over and alongside of the feeding devices, as clearly shown in Fig. 4. As best shown in said Fig. 4, the inner end of the bar 74 is swingingly supported by two links 76, 76 each mounted in an eye 77 secured to a brace 78 that extends across the upper portion of the hopper and is bolted to the front and rear walls thereof so that said links swing longitudinally of the hopper. As shown in Fig. 3 this cross-bar is located at substantially the longitudinal center of the hopper and affords support for the links that are employed in connection with the agitating means in each half of the machine. The outer end of the bar 74 is pivoted at 79 to the lower portion of the long arm 80 of a bell crank lever that is pivoted at 81 to a bracket 82 secured to the inner face of the end wall 12 of the hopper. The short arm of the bell crank is indicated by 83 and as clearly shown in Fig. 3 it extends through a slot in said end wall and at its outer end is formed to provide a substantially spherical head 84. Connected with the head 84 is an eccentric-rod or pitman 85 which is provided with a socket bearing to receive said head. The lower half of this socket is formed integral with the pitman 85 and is indicated by 86; the upper half of the socket is in the form of a cap indicated by 87 which is clamped to the pitman by a truss rod 88 (see Fig. 1),—the screw-threaded ends of this truss-rod passing through flanges of the two-part socket, as shown in Fig. 1, and being secured in place by nuts, and the central portion of such rod extending around and beneath the pitman 85, as shown in Fig. 3. The reciprocation of the eccentric-rod or pitman is effected by an eccentric 89 that is clamped to the spokes of the ground wheel 21, the lower end of the pitman being provided with a large bearing or eccentric-strap 90 that surrounds the eccentric. As the wheel turns, it of course carries the eccentric 89 with it, thereby actuating the eccentric-rod or pitman and causing a rocking of the bell-crank about the pivot 81, which in turn reciprocates the agitating means so as to cause a thorough stirring of the mass of fertilizer material in the hopper. It will be noted that the link 76 and arm 80 by which the opposite ends of the agitator bar 74 are suspended converge downwardly. Consequently, as said agitator bar is reciprocated by the rocking of the arm 80 the opposite ends thereof have a relative vertical movement, or, in other words, said bar rocks about a shiftable transverse axis, which compound movement of the agitator bar causes its arms 75 to effectively stir and break up the material in the hopper so that it may be fed properly by the feeding devices carried by the shaft 46. By reason of the downwardly-diverging disposition of said arms 75 they may be placed quite close to the feeding devices without danger of their striking the same when the agitator bar is moved up and down or endwise, and their proximity to the feeding devices causes them to operate more effectively in loosening up the material passing to said feeding devices. By connecting the agitator bar 74 to the bell-crank lever as described power is applied to said agitator bar in the most direct and positive manner for moving it. 91 is an oil passage in the bearing or eccentric-strap 90. 92 is a shield bolted to the end wall 12 of the hopper above the ball and socket bearing of the pitman and bell-crank to prevent dirt carried by the wheel from falling directly upon such bearing. 93 is the draft pole rigidly secured to the hopper by braces 94, 95, and 96 indicates another brace extending outwardly and downwardly from the tongue and secured to a bracket extending forwardly from one of the spindle members 16. A brace such as 96 will be employed at each side of the tongue. 97 indicates braces for reenforcing the walls of the hopper, and 98 indicates a hinged deflector board pivotally swung from the lower ends of braces such as 97 that are secured to the front wall of the hopper. The angular position of this board can be adjusted by means of a chain 99 which engages a suitable hook carried by one of the rear braces 97. The object of this board is to prevent light fertilizer, such as dry lime and ashes, from being blown by the wind while it is falling from the openings in the bottom of the hopper to the ground.

By the construction described I provide a machine which, while adapted to deliver fertilizer over an area as wide as the length of the hopper, may have the feeding mechanism in one half of the hopper readily and quickly thrown out of action without disturbing the corresponding feeding mechanism in the other half. Furthermore, by such construction a machine is provided wherein the separate feeding devices at opposite sides of the longitudinal center of the hopper are separately connected up for driving purposes with the adjacent supporting wheels, and so connected with the wheels that, when desired, either or both of the feeding devices may be very quickly detached and removed, thus facilitating the thorough cleaning of the hopper so as to prevent the caking or solidifying of material that might occur if allowed to remain during the times when the machine was not in operation. Prior to removing the feeding device the agitator that is suspended above it should, of course, be removed, which, as will be evident from an inspection of Fig. 3 can be very readily and easily accomplished.

Another feature of very considerable importance is the spindle bearing construction. By the construction hereinbefore described it will be seen that with the spindle secured to the hopper, the wheel rotating on the exterior of the spindle, and the power for operating the feeding device being taken from the wheel exteriorly of the spindle and transmitted back through the interior of the spindle to the feeding device, the driving parts for the feeding device are thereby wholly freed from the strain of carrying or supporting the weight of the machine and its contents.

The agitating devices, and the manner of mounting the feeder shaft in the hopper, are not claimed herein, as they form the subject matter of a divisional application for patent.

What I claim as my invention and desire to secure by Letters Patent, is—

1. A machine of the class described, comprising in combination a hopper, a hollow spindle secured to and projecting from one end of the hopper, a supporting wheel mounted on said spindle, a rotatable shaft extending through said spindle, clutch mechanism for connecting the shaft and wheel together, a rotatable feeding device in the hopper, and means for connecting the said shaft and feeding device together.

2. A machine of the class described, comprising in combination a hopper, a hollow spindle secured to and projecting from one end of the hopper, a supporting wheel mounted on said spindle, a rotatable shaft extending through said spindle, clutch mechanism for connecting the shaft and wheel together, a rotatable feeding device in the hopper, and means for detachably interlocking said shaft and feeding device together.

3. A machine of the class described, comprising in combination a hopper, a hollow spindle secured to and projecting from one end of the hopper, a supporting wheel mounted on said spindle, a rotatable shaft extending through said spindle, means for detachably connecting the wheel and shaft together, a socketed member secured to the inner end of the shaft, and a rotatable feeding device in the hopper having an end portion removably inserted in said socketed member.

4. A machine of the class described, comprising in combination a hopper, a hollow spindle secured to and projecting from one end of the hopper, a supporting wheel mounted on said spindle, a rotatable shaft extending through said spindle, means for connecting the wheel and shaft together, a socketed member secured to the inner end of the shaft and projecting into the hopper, a dust-excluding washer surrounding the projecting end of said member, and a rotatable feeding device in the hopper having an end portion removably inserted in said socketed member.

5. A machine of the class described, comprising in combination a hopper, a hollow spindle secured to and projecting from one end of the hopper, a supporting wheel mounted on said spindle, a rotatable shaft extending through said spindle, means for connecting the wheel and shaft together, a socketed member secured to the inner end of the shaft and projecting through the end wall of the hopper, a spring-pressed dust-excluding washer surrounding the projecting end of said member, and a rotatable feeding device in the hopper having an end portion removably inserted in said socketed member.

6. A machine of the class described, comprising in combination, a hopper, a hollow spindle secured to and projecting from one end of the hopper, a supporting wheel mounted on said spindle, a rotatable shaft extending through said spindle, a rotatable feeding device in the hopper in alinement with the shaft, a member for interlocking said feeding device and shaft together, a spring-pressed dust-excluding washer mounted upon said member, and means comprising a clutch for connecting said shaft and wheel together.

7. A machine of the class described, comprising in combination, a hopper, a hollow spindle secured to and projecting from one end of the hopper, a rotatable sleeve on said spindle, a supporting wheel secured to and rotating with said sleeve, a rotatable shaft extending through said spindle, mechanism comprising a clutch adapted to connect said sleeve and shaft together, a rotatable feeding device in the hopper, and means for connecting said shaft and feeding device together.

8. A machine of the class described, comprising in combination a hopper, a hollow spindle secured to and projecting from one end of the hopper, a supporting wheel mounted on said spindle, a rotatable shaft extending through said spindle, mechanism including a clutch connecting said wheel and shaft together, a socketed member secured to the inner end of the shaft, and a feeding device in alinement with the shaft, said feeding device having its end portion in removable engagement with said socketed member.

WILLARD A. VAN BRUNT.